Patented Oct. 6, 1931

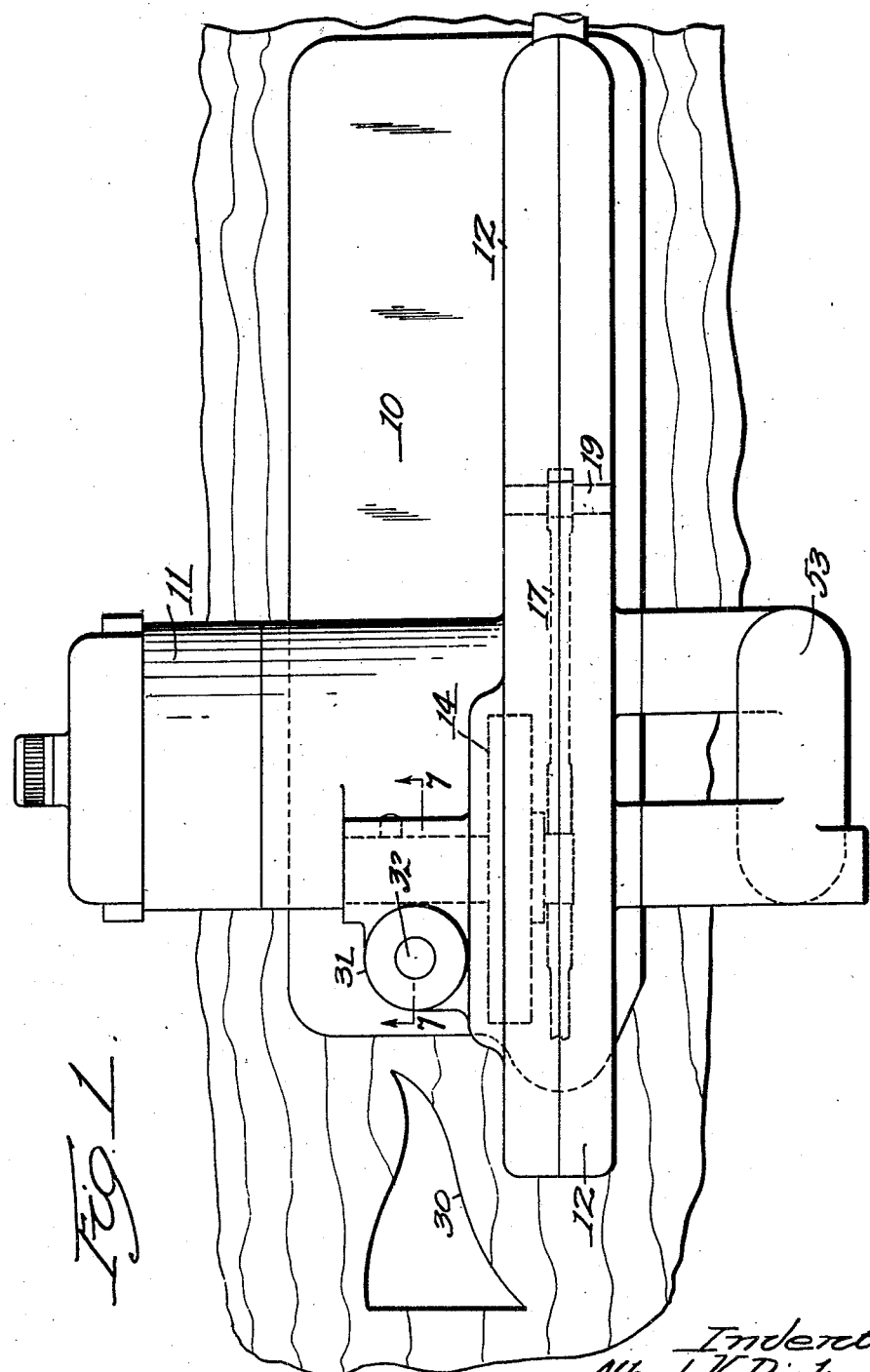

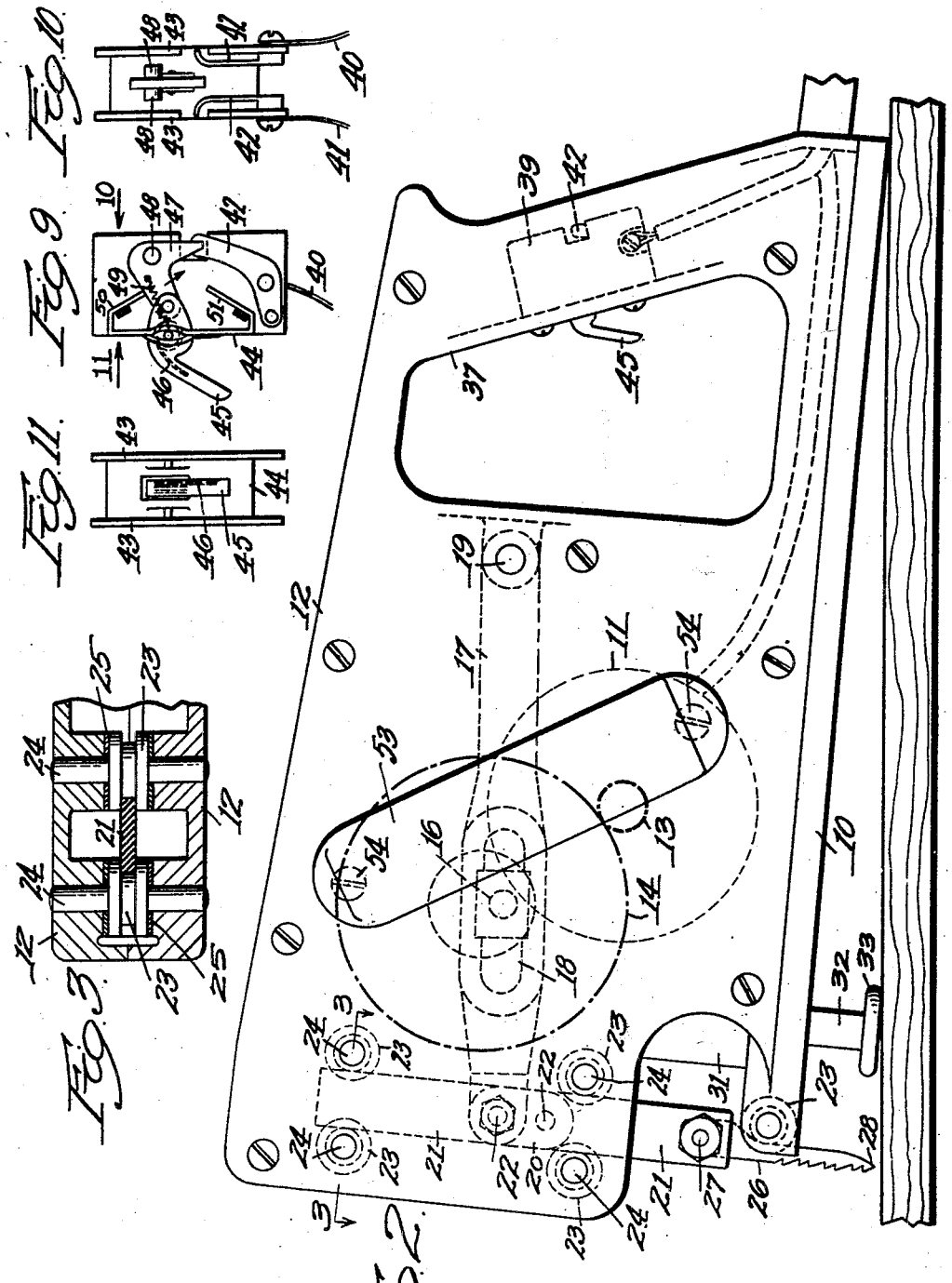

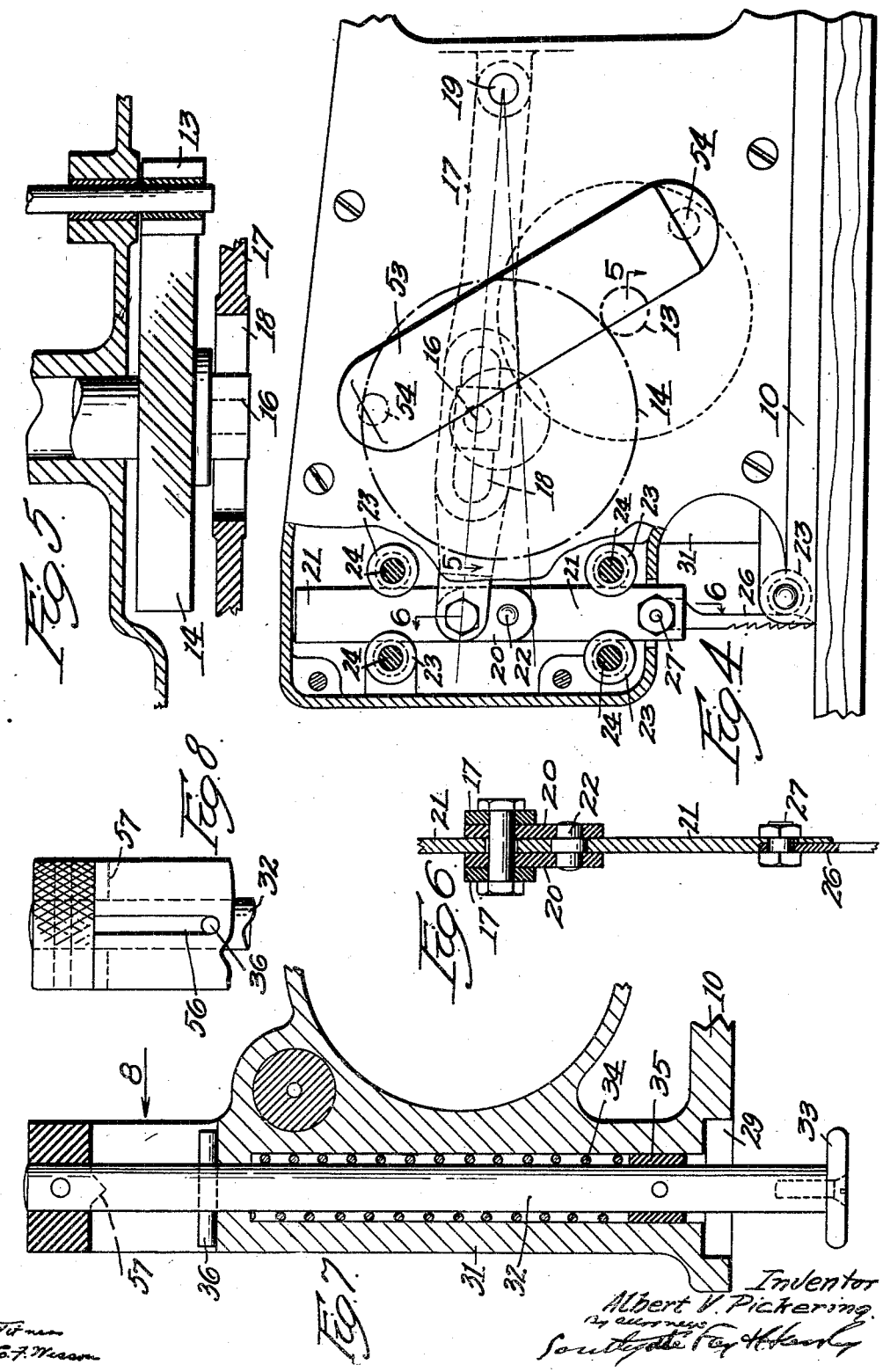

1,826,187

UNITED STATES PATENT OFFICE

ALBERT V. PICKERING, OF WOONSOCKET, RHODE ISLAND, ASSIGNOR, BY MESNE ASSIGN-MENTS, TO PORTABLE ELECTRIC TOOL CORPORATION, OF FITCHBURG, MASSACHU-SETTS, A CORPORATION OF MASSACHUSETTS

JIG SAW

Application filed January 17, 1929. Serial No. 333,191.

This invention relates to a motor operated jig saw capable of use to cut wood, fibre, metal and other materials.

The principal objects of the invention are to provide a construction which is operated by a motor at a high speed in which the saw itself reciprocates in a straight line, although driven by a rotary element; to provide a construction which will start the hole itself and there are no holes to drill; to provide a construction in which the saw table will not chatter but the saw will run smoothly at all times; to provide means whereby the saw can be applied to the work without injuring the saw or the plate or sheet being cut; to provide an improved saw blade therefor and especially to provide a construction which will cut the labor costs of this kind of work.

Other objects and advantages of the invention will appear hereinafter.

Reference is to be had to the accompanying drawings in which

Fig. 1 is a plan of a machine constructed in accordance with this invention, showing it resting on the work and showing a sample of the work that can be done;

Fig. 2 is a side elevation of the same showing the frames lifted, before the sawing operation starts;

Fig. 3 is a sectional view on the horizontal line 3—3 of Fig. 2;

Fig. 4 is a view like Fig. 2 with the machine resting on the work ready for sawing, and with parts in section;

Fig. 5 is a sectional view on the line 5—5 of Fig. 4;

Fig. 6 is a sectional view on the line 6—6 of Fig. 4;

Fig. 7 is a sectional view on the line 7—7 of Fig. 1;

Fig. 8 is a side view as indicated by the arrow 8 in Fig. 7;

Fig. 9 is a side view of an electric switch which is preferred to be employed with this device, with the front plate removed, and Figs. 10 and 11 are opposite edge views of the same as indicated by the arrows 10 and 11 in Fig. 9.

The invention is shown as comprising a flat bottomed base 10, preferably of aluminum so that it can be lifted around readily but large enough so as to provide a substantial support for the mechanism. On this base is mounted a motor 11 and integral with it is cast a frame 12. On the motor shaft is a spiral steel pinion 13 meshing with a spiral gear 14, both being formed preferably of fibre or some noiseless substance. The gear 14 is mounted on a shaft carried by the frame 12 and is provided with an eccentric pin 16 on the inner side where it is protected by part of the frame from any possible injury to the operator.

At a point on the frame at the rear is pivoted a bar 17 which has a slot 18 for receiving the pin 16. Therefore, the rotation of the gear will oscillate the bar about its pivot stud 19. The free end of this pivoted bar is provided with two pivoted links 20 carrying a pin 22 which passes through a vertical cutter slide 21. Therefore this cutter slide will be reciprocated by the operation of the parts previously described.

The cutter slide is mounted to reciprocate vertically and held against motion in any other direction by two pairs of grooved rolls 23 mounted in the frame 12, which has slots for that purpose. These rolls are held in proper position by studs 24 on which the rolls are free to turn and on the outsides of the rolls are washers 25 held in position by these studs. The grooves in the rolls receive the opposite edges of the tool slide.

On the bottom of the tool slide 21 it is provided with a vertical depression in which it is adapted to receive the upper end of a saw blade 26; this upper end being shaped to just fit in this depression so that the saw blade will move with the slide and be rigidly connected to it by means of a bolt 27 passing through the blade and the slide.

The saw blade is provided with a sharp end 28 adapted to batter its way into a piece of wood without previous drilling thereof. In the preferred form the blade is provided with alternate short and long teeth, the teeth being sharp and set as in all wood saws. The rear edge is straight and vertical and bears on another guide roll 23 which backs it up and holds it firmly in position. This constitutes a very effective blade for working on wood and on account of the rapid reciprocation of the slide and the rigid connection of the blade therewith and particularly on account of the nature of the saw blade just described, this blade will quickly provide a hole through the wood and then, while it is running, the operator can move the whole machine around on the wood to provide a curved cut of any desired character as indicated at 30 in Fig. 1.

In order that the blade need not be injured or the material on which it is placed by putting the frame down on it, I have provided a lifting device comprising a cylinder 31 integrally or otherwise fixedly connected with the frame 12 and having a cylindrical passage in it. In this passage is a pin 32 having a head 33 on the bottom. The head is adapted to rest on the work and a spring 34, which surrounds the pin and engages a collar 35 on the pin, normally forces the pin down where the head will be below the plane of the bottom of the base 10, as shown in Fig. 7. When the machine is to be placed on the work the operator moves it to the proper place, the spring holding the frame and saw up. When he gets it in the proper place he grasps the cylinder 31 in his hand or a handle and forces it down to the work which forces the lower head up into the socket 29. The pin 32 can be held up by turning it, when raised, so a cross pin 36, normally sliding in slots 56 will be received in notches 57 at right angles thereto. The pin 32 is raised in the base by forcing the base down flat on the work, thus compressing the spring 34 and bringing the cross pin 36 up to the level of the horizontal notches 57. Then the head at the top of the pin 32 is turned. No further attention is paid to this lifting device.

In inclined position on the side of the frame is a handle 53 for the left hand. It is made separate and secured to the frame by bolts 54.

At the rear of the frame 12 I have shown a handle by which the operator manipulates the machine to move it around the flat surface on which it is located. This handle comprises an inclined member 37 integral with the frame 12 and having a space therein in which is located an electric switch 39. This is for the purpose of connecting one of the leading wires 40 with one of the wires 41 which goes to the motor. These wires are secured to two metallic terminals 42 by binding screws. These terminals are mounted on two insulating plates 43 in stationary position and they project outwardly in opposite directions forming a pair of oppositely inclined walls. These terminals also are in the form of springs.

The switch also comprises a metallic frame 44 on which is pivoted a trigger operating member 45 normally pressed upwardly by a spring 46. To it is pivoted a lever 47 having contacts 48 which are connected with each other. When the trigger 45 is pressed down the contacts 48 are forced between the springs 42 and connect the two lines so that the motor will be operated. A spring 49 assists in bringing the lever 47 back out of the way against a stop 50. The extreme end o the lever engages a projection or stop 51 on the frame 44 when the contact is made to prevent its moving beyond that position. The two springs 46 and 49 force the parts up into non-connecting position when the trigger is released. The trigger is located on the inner side of the handle where the operator can press it or release it during the operation as he sees fit.

The several features of the invention have been described in full and their advantages stated. Although I have illustrated and described only one form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In a jig saw, the combination with a supporting base adapted to be moved freely on the surface of the material to be sawed, of a pivoted bar, a reciprocable slide pivotally connected with the bar, a saw blade carried by the slide, means for rapidly oscillating the bar to reciprocate the slide, and a bearing and guiding roller located at the back of the saw at a point close to the bottom of the base, said roller having a groove for receiving the slide and saw.

2. In a jig saw, the combination with a base, a motor mounted on the base and a frame carried by the base and having means thereon for operating a saw from the motor, of a headed pin reciprocably mounted on the frame in vertical position near the saw, and having a spring for lowering its head below the bottom of the base, whereby when the saw is projected a short distance below said base the frame can be moved around on a surface to be sawed and the saw held out of operative position by said pin, said pin having a second head fixed to its upper end and adapted to be turned to turn the pin, a cross pin on said pin, the base having a transverse groove for receiving the cross pin, whereby, when turned from normal position, the first-named pin will be held up so as not to project through the bottom of the base, thus allowing the entire base to rest flat on the work.

3. In a jig saw, the combination with a base, of the motor mounted on said base, a wheel rotatably supported by said base and geared to the motor, said gear having an eccentric pin, a pivoted oscillatable bar having a longitudinal slot, a sliding block in said slot having a perforation receiving said pin whereby said bar is oscillated, a reciprocable slide pivotally connected with the end of the bar, means on the frame for guiding the slide to move vertically, and a saw fixed on said slide.

In testimony whereof I have hereunto affixed my signature.

ALBERT V. PICKERING.